United States Patent
Krutzsch et al.

[11] Patent Number: 5,921,076
[45] Date of Patent: Jul. 13, 1999

[54] PROCESS AND APPARATUS FOR REDUCING NITROGEN OXIDES IN ENGINE EMISSIONS

[75] Inventors: Bernd Krutzsch, Denkendorf; Christian Goerigk, Leutenbach; Stefan Kurze; Günter Wenninger, both of Stuttgart; Walter Boegner, Remseck; Friedrich Wirbeleit, Esslingen, all of Germany

[73] Assignee: Daimler-Benz AG, Stuttgart, Germany

[21] Appl. No.: 08/781,040

[22] Filed: Jan. 9, 1997

[30] Foreign Application Priority Data

Jan. 9, 1996 [DE] Germany .......................... 196 00 558
Mar. 13, 1996 [EP] European Pat. Off. .............. 96103917

[51] Int. Cl.⁶ .......................................................... F01N 3/00
[52] U.S. Cl. .................................. 60/274; 60/286; 60/300
[58] Field of Search .............................. 60/274, 286, 301, 60/303, 284

[56] References Cited

U.S. PATENT DOCUMENTS

| 3,170,758 | 2/1965 | Honerkamp .................................. 23/2 |
| 5,272,871 | 12/1993 | Oshima et al. . |
| 5,474,745 | 12/1995 | Fukui et al. . |
| 5,522,218 | 6/1996 | Lane ......................................... 60/274 |
| 5,524,432 | 6/1996 | Hansel ...................................... 60/274 |

FOREIGN PATENT DOCUMENTS

| 0441401A1 | 8/1991 | European Pat. Off. . |
| 537 968A1 | 4/1993 | European Pat. Off. . |

OTHER PUBLICATIONS

Search Report May 6, 1997 Europe.
Patent Abstracts of Japan, vol. 002, No. 072, May 31, 1978 JP53026270, Mar. 10, 1978.
Patent Abstracts of Japan, vol. 012, No. 292, Aug. 10, 1988, JP63068714, Mar. 28, 1988.

*Primary Examiner*—Thomas E. Denion
*Assistant Examiner*—Binh Tran
*Attorney, Agent, or Firm*—Evenson, McKeown, Edward & Lenahan P.L.L.C.

[57] ABSTRACT

A process and apparatus for reducing the nitrogen oxide content in oxygen-containing emissions is provided, particularly for internal-combustion engines, particularly of diesel engines and directly injecting Otto engines for motor vehicles. The nitrogen oxides contained in the exhaust gas are reduced by a suitable reducing agent, such as hydrogen or hydrocarbons, on a DENOX catalyst. For achieving an improved conversion rate for the nitrogen oxides, a combination of hydrogen and hydrocarbons are used as reducing agents. In different operating ranges of the internal-combustion engine only hydrogen, only hydrocarbons, or hydrogen and hydrocarbons are added. Preferably, for this purpose, the quantity of supplied hydrogen or hydrocarbons is reduced or increased with an increasing engine load and/or catalyst temperature and/or rotational engine speed.

17 Claims, 4 Drawing Sheets

PROCESS AND APPARATUS FOR REDUCING NITROGEN OXIDES IN ENGINE EMISSIONS

BACKGROUND AND SUMMARY OF THE INVENTION

This invention relates to a process and apparatus for reducing the nitrogen oxide content in oxygen-containing emissions of internal-combustion engines, particularly of diesel engines and directly injecting Otto engines for motor vehicles, where the nitrogen oxides are reduced on a catalyst by means of a reducing agent added in a metered manner to engine exhaust gases.

Such a process is known from European Patent Document EP 537,968 Al, in which case the nitrogen oxides are converted by means of hydrogen as a reducing agent on a platinum/zeolite catalyst. However, the catalytic NOx reduction on platinum-containing catalysts has the disadvantage that a sufficient conversion rate is ensured only in a relatively narrow temperature window.

Furthermore, it is known to reduce nitrogen oxides by means of hydrocarbons as reducing agents by means of a so-called DENOX catalyst. Such processes have their conversion maximum at higher temperatures. However, in the European driving cycle required by law, even in the case of the selection of optimal conditions concerning the reducing agent and the DENOX-catalyst, so far an NOx-reduction of only 10–15 has been achieved. This, however, it not sufficient for ensuring future emission limit values for motor vehicles. In addition, in the case of modern diesel engines, there is the problem that hydrocarbons are not longer contained to a sufficient extent in the emissions.

It is an object of the invention to improve a process for reducing the nitrogen oxide content in oxygen-containing emissions such that an increased conversion rate is ensured over a wide temperature range, including at temperatures starting from approximately 100° C.

According to the invention, this object is achieved by a process of the above mentioned type comprising operating the engine in a first operating range with only hydrogen being supplied as a reducing agent to the exhaust gas upstream of the catalyst, operating the engine in a second operating range with both hydrogen and hydrocarbons being supplied as reducing agents to the exhaust gas upstream of the catalyst, and operating the engine in a third operating range with only hydrocarbons being supplied as a reducing agent to the exhaust gas upstream of the catalyst.

The invention is based on the experimentally confirmed recognition that, for ensuring a sufficient NOx-reduction, hydrogen as well as hydrocarbons must be contained in the exhaust gas at a ratio predetermined as a function of operating conditions. As a result of the suitable combination of both reducing agents, a synergistic effect is obtained, in which case the hydrogen has an activating effect on the course of the NOx-reduction. In this case, the hydrogen increases the selectivity of the HC-NOx reaction and simultaneously reduces the selectivity for the production of nitrous oxide ($N_2O$).

During the tests carried out on platinum-containing catalysts, it was found that, in the presence of a minimum concentration of hydrocarbons in the exhaust gas, in addition to the conversion maximum of approximately 100° C. characteristic of hydrogen, a second conversion maximum between 250° and 350° C. can be observed. In addition, also at very low hydrocarbon Nox ratios at which so far only low NOx conversions could be observed, relatively high NOx conversion rates were achieved in the presence of small amounts of hydrogen.

The decisive factor for a sufficient NOx reduction on a DENOX catalyst is therefore the correct proportion of hydrogen to hydrocarbons in the exhaust gas as a function of the catalyst temperature. For this reason, the proportioning of the two reducing agents preferably takes place as a function of the catalyst temperature and/or the engine load and/or the rotational engine speed, preferably controlled by a characteristic diagram. The physical quantity on which the proportioning is based is the NOx flow rate.

Many processes can be used for providing hydrocarbons. In the case of engines which are equipped with a so-called commonrail high-pressure injection system, the possibility is particularly advantageous of adjusting a desired proportion of hydrocarbons in the exhaust gas by a targeted afterinjection of a given fuel quantity into the internal-combustion engine. In the case of such engines, in addition, by means of an early afterinjection of fuel, it is possible to produce the required hydrogen.

Other objects, advantages and novel features of the present invention will become apparent from the following detailed description of the invention when considered in conjunction with the accompanying drawings.

DETAILED DESCRIPTION OF THE DRAWINGS

Figure 1:
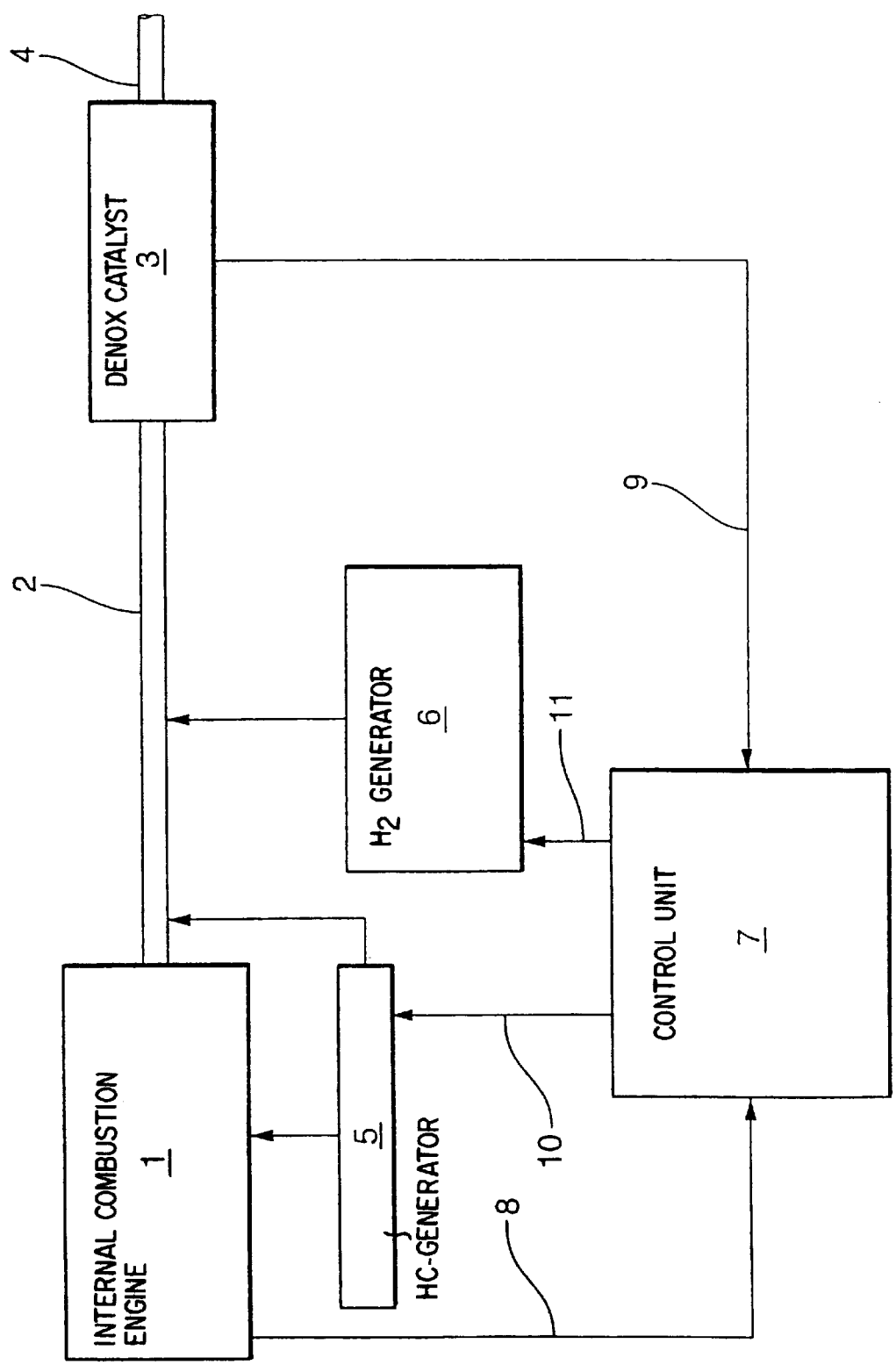
FIG. 1 is a basic diagram of an arrangement for carrying out the process according to the invention.

According to FIG. 1, the exhaust gas generated by an internal-combustion engine which, as a whole, has the number 1, is fed by way of an exhaust gas pipe 2 to a so-called DENOX catalyst 3. The purified exhaust gas is then discharged into the environment by way of another pipe 4. Furthermore, an arrangement for supplying hydrocarbons is provided which in the following will be abbreviated to HC-generator 5, and an arrangement for supplying hydrogen is provided which in the following will be called an $H_2$ generator 6. The hydrocarbons and/or the hydrogen are introduced upstream of the DENOX catalyst 3 as reducing agents into the exhaust gas pipe 2.

Any arrangement for generating or storing hydrogen can be used as the $H_2$ generator 6. Particularly for a use in motor vehicles, the electrolysis of water, the generating of cracked gas or the reforming of methanol can be used for this purpose. Different possibilities are also known for providing the hydrocarbons. On the one hand, fuel can be entered into the exhaust gas pipe 2 in a metered manner. In this case, the HC generator 5 is constructed as a simple metering valve. In addition, it is also possible to prepare the fuel before the introduction into the exhaust gas pipe 2 in order to produce more reactive hydrocarbons. This is advantageous because, in the case of platinum-containing catalysts, mainly shortchain, unsaturated hydrocarbons are suitable for the NOx reduction. In this case, the HC generator 5 is constructed as an apparatus for preparing the fuel. Apparatuses for the catalytic or thermal cracking of fuel, for example, are suitable for this purpose.

A preferred embodiment relates to motor vehicle diesel engines with a so-called common rail system in which, at predetermined points in time and in predetermined quantities, the fuel is injected into the internal-combustion engine 1 at high pressure. However, other injection system can also be used to practice the invention, in which case, however, a variable control of the injection times and quantities must be ensured. Particularly in the case of such diesel engines 1 with a common rail injection system, normally only a very low proportion of hydrocarbons is still present in the exhaust gas. According to the invention, in the case of these diesel engines 1, the hydrocarbons required in the exhaust gas are generated by a targeted afterinjection of fuel. In this context, afterinjection means that the injection takes place in a time-staggered manner and in addition to the normal amount of fuel determined for the proper operation of the internal-combustion engine 1. In this case, the common rail injection system is therefore used as the HC generator 5.

In the case of such engines with common rail injections systems, it is also possible to increase, by means of an early afterinjection of fuel, the residue of hydrogen in the exhaust gas. A suitable point in time for the early afterinjection is either so late that the combustion is concluded; that is, the fuel is completely converted after the main injection; and so early that the thermal potential in the combustion chamber is sufficient for releasing, from the afterinjected fuel, a sufficient amount of hydrogen by thermal cracking; or slightly earlier so that the cracking products, while the combustion is not concluded, can be positively affected so that the NOx conversion can be further improved.

For metering the reducing agents hydrogen and/or hydrocarbon, a control unit 7 is provided. By way of measuring inputs 8, 9, the operating parameters of the internal-combustion engine 1 and the temperature of the DENOX catalyst 3 are supplied as input quantities to this control unit 7. By means of these operating parameters, control or regulating signals for the reducing agent supply are then generated in the control unit 7 and are supplied by way of control lines 10, 11 to the HC generator 5 and the $H_2$ generator 6.

Figure 2:
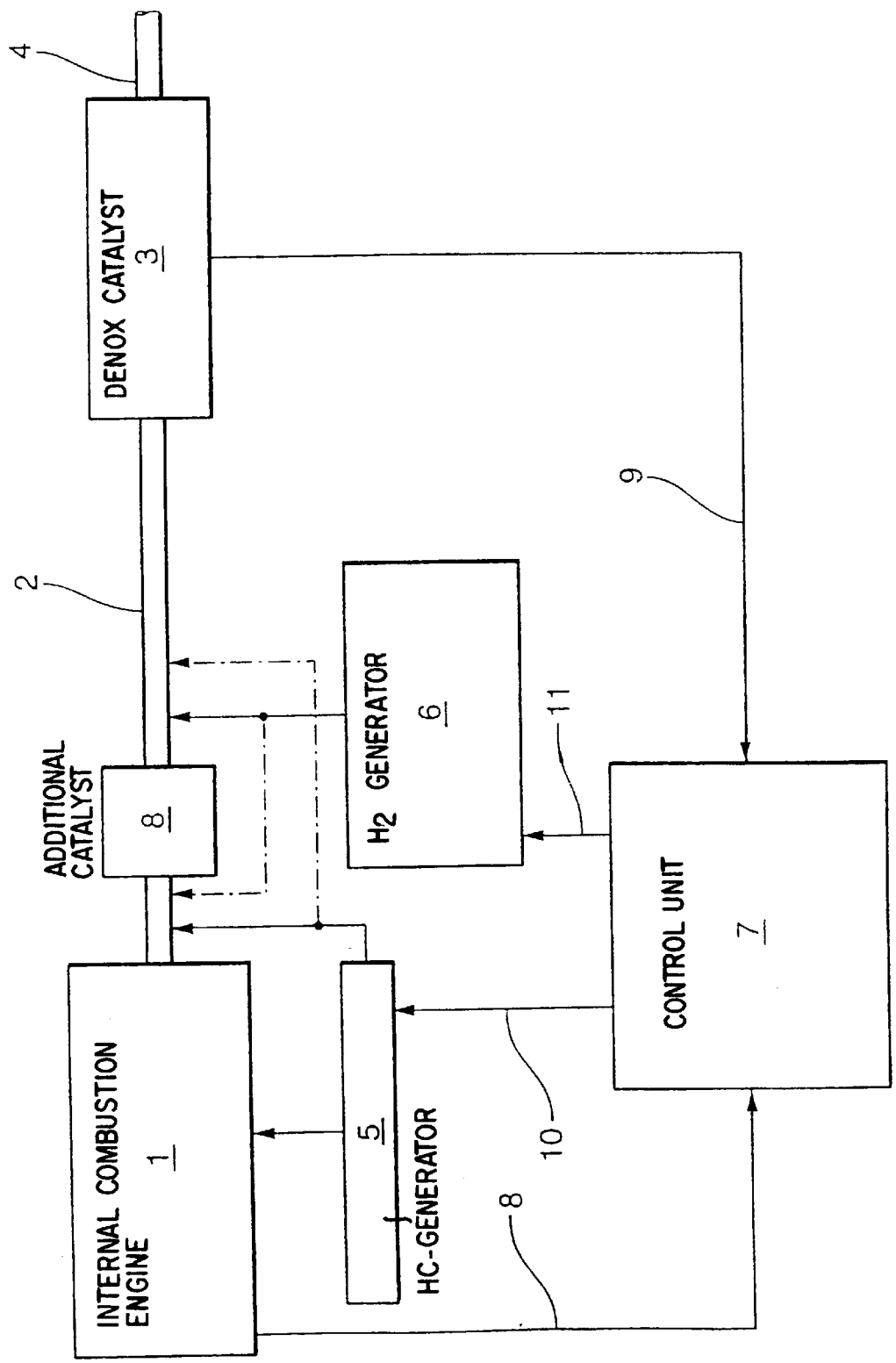
FIG. 2 is a view of a further development of the arrangement according to FIG. 1.

A further development of the arrangement of FIG. 1 is illustrated in FIG. 2, in which case coinciding characteristics are characterized by identical reference numbers. In contrast to FIG. 1, an additional catalyst 8 is provided in the exhaust gas pipe. By means of this second catalyst or optionally additional catalysts 8, the flexibility during the metering can be increased. The second catalyst 8 is arranged close to the engine and is therefore operated at increased temperatures, while first catalyst 3 arranged downstream of the second catalyst 8 operates at lower temperatures. In a preferred embodiment, the hydrocarbons are introduced upstream of the second catalyst 8 and the hydrogen is introduced between the first and second catalyst 3, 8 into the exhaust gas pipe 2. In this case, the second catalyst 8 is constructed such that, at low temperatures, it can intermediately store hydrocarbons. This is advantageous particularly during the cold starting phase since, at the low temperatures, no sufficient reduction of the nitrogen oxides on the catalyst 8 is ensured. At higher temperatures, these hydrocarbons are then released again and in the process reduced on the catalyst 8. By the addition of hydrogen upstream of the first catalyst 3, it is ensured that excess hydrocarbons are converted on the first catalyst 3 and thus are not discharged to the environment. However, in addition to the arrangement described here, additional configurations with more than two catalysts are also conceivable. In addition, the hydrogen and/or the hydrocarbons can be added upstream and/or downstream of the second catalyst 8 which is illustrated in FIG. 2 by broken lines. When a common rail system is used as the reducing agent generator 5, 6, however, the addition of the reducing agent takes place directly in the internal-combustion engine 1 and therefore upstream of the second catalyst 8.

Figures 3, 4:
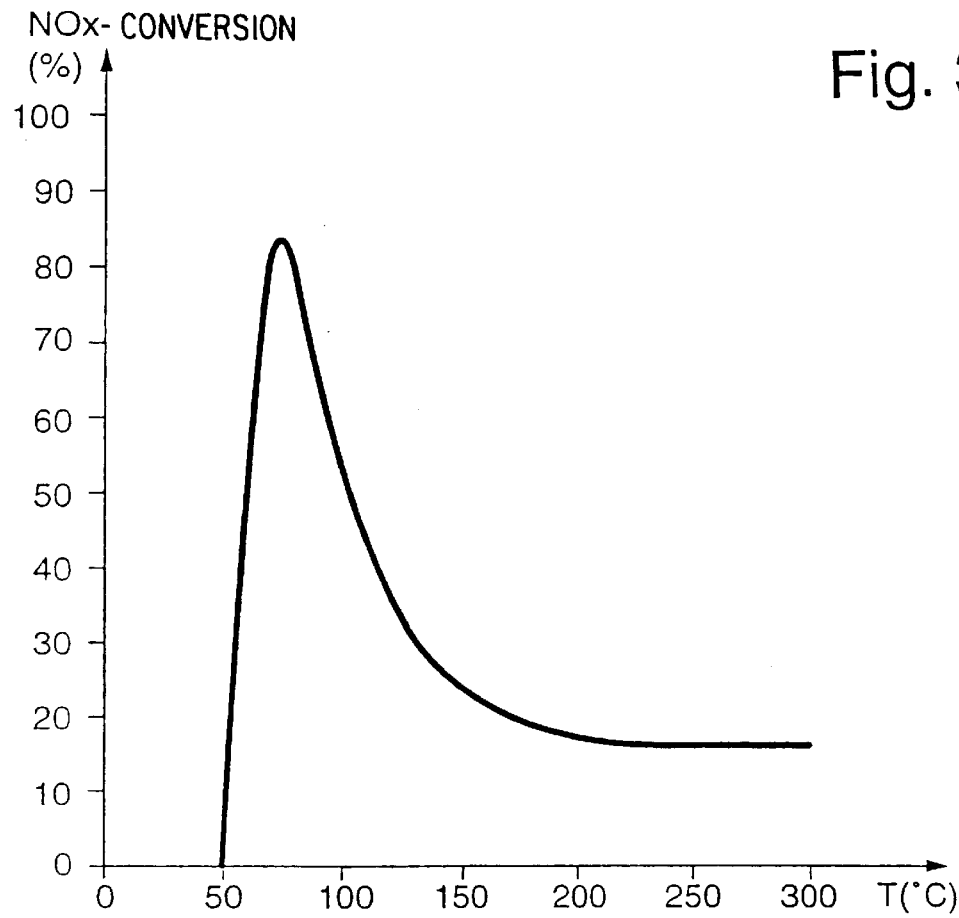
FIG. 3 is a diagram of the NOx-conversion rates in lab tests with synthetic exhaust gas and hydrogen as a reducing agent.
FIG. 4 is another diagram of the NOx conversion rates in a test on an engine test bed with diesel emissions when hydrogen and hydrocarbons are used as reducing agents on a new or cleaned catalyst.

The metering of the reducing agents takes place such that, in a first operating range of the internal-combustion engine 1, only hydrogen is added to the exhaust gas; in a second operating range, hydrogen as well as hydrocarbons are added to the exhaust gas; and in a third operating range only hydrocarbons are added to the exhaust gas. The operating ranges are preferably characterized by different catalyst temperatures. At low catalyst temperatures, only hydrogen is added to the exhaust gas. The reason is that, in the case of platinum-containing DENOX catalysts 3, which are normally used, in the case of the addition of hydrogen, a relatively narrow window with a favorable NOx conversion rate can be observed in the low temperature range. The principal course of such a NOx conversion curve with hydrogen as the reducing agent entered above the catalyst temperature is illustrated in FIG. 3. A temperature window is shown which has a maximal NOx conversion rate between 50° and 150° C. At temperatures above 150° C., however, the NOx conversion rate is no longer satisfactory.

Figure 5:
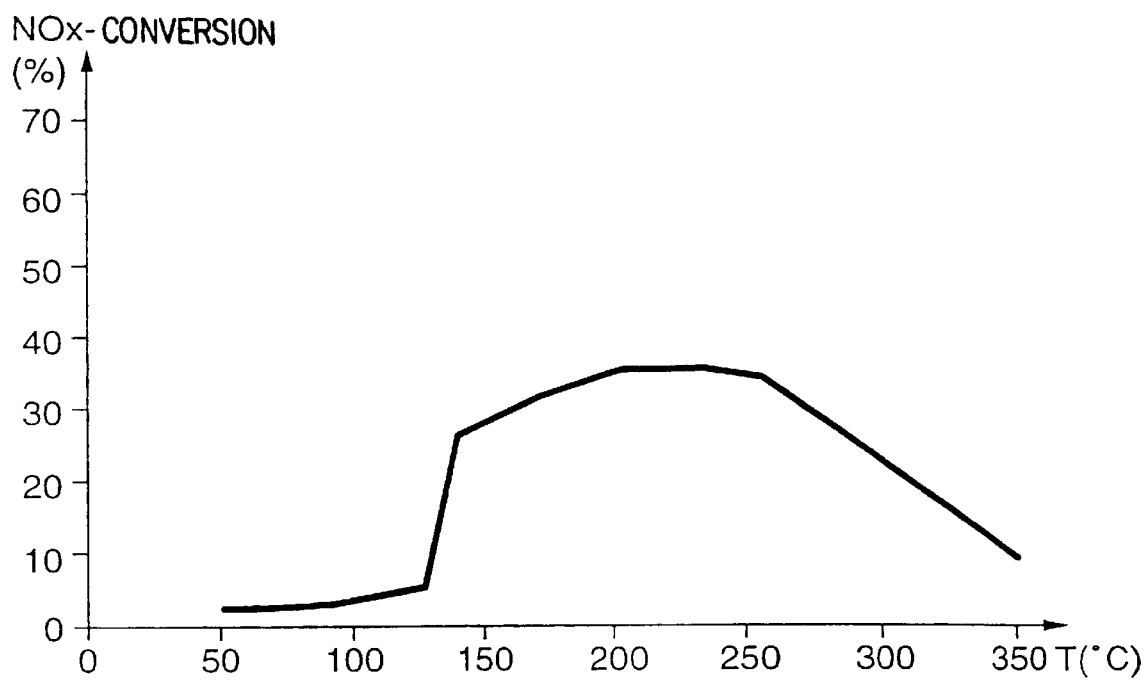
FIG. 5 is the diagram according to FIG. 4 for a stabilized catalyst.

FIG. 4, in turn, shows the basic course of such an NOx curve on a platinum-containing DENOX catalyst 3 entered above the catalyst temperature, a mixture of hydrogen and hydrocarbons being used here as reducing agents. By means of this measuring curve, it is clearly demonstrated that although, in comparison to FIG. 3, the NOx conversion rate decreases in the low temperature range, and a clearly higher NOx conversion rate occurs in the medium and higher temperature range. By means of a suitable metering of hydrogen and hydrocarbons, it is therefore possible to optimize the NOx conversion rate for any temperature range. In addition, by means of the addition of hydrogen, the breakthrough of hydrocarbons not converted on the catalyst is avoided. FIG. 5 finally shows the course of the NOx conversion rate corresponding to FIG. 4, but for a stabilized catalyst; that is, after a longer operating period. Although in this case the pronounced maxima disappear, on the whole, the improved NOx conversion rate is maintained over the whole temperature range.

The determination of the desired quantity of the respective reducing agent takes place in the control unit 7. Preferably as a direct function of the catalyst temperature, here the required quantities of hydrogen or hydrocarbons are determined, in which case the supplied hydrogen quantity decreases with an increasing catalyst temperature and the quantity of hydrocarbons increases correspondingly. A characteristic-diagram-controlled metered addition of the reducing agents is also contemplated. Finally, as the input quantity for the metering, instead of the catalyst temperature, the engine load or other operating parameters can be used which directly or indirectly influence the catalyst temperature. The determined values for the reducing agents are transmitted by way of control lines 10, 11 from the control unit 7 to the HC or hydrogen generator 5, 6. In these generators 5, 6, the generating and/or metering of the reducing agents will then be adjusted corresponding to these data.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. The process for reducing nitrogen oxide content in oxygen-containing emissions of internal-combustion engines, the nitrogen oxide content being reduced on a catalyst by means of a reducing agent added in a metered manner to the exhaust gas as a function of operating temperatures, said process comprising:

operating the engine in a first operating range with only hydrogen being supplied as a reducing agent to the exhaust gas upstream of the catalyst, operating the engine in a second operating range with both hydrogen and hydrocarbons being supplied as reducing agents to the exhaust gas upstream of the catalyst, and operating the engine in a third operating range with only hydrocarbons being supplied as a reducing agent to the exhaust gas upstream of the catalyst.

2. The process according to claim 1, wherein the reducing agents are added in a metered manner as a function of at least one of the catalyst temperature and the engine load, the hydrogen quantity of the reducing agents or the hydrocarbon quantity being reduced or increased with at least one of an increasing catalyst temperature and engine load.

3. The process according to claim 1, wherein the metered addition of the reducing agents takes place in a characteristic-diagram-controlled manner.

4. Process according to claim 1, wherein the metering of the hydrocarbons takes place by the controlled addition of fuel to the exhaust gas.

5. The process according to claim 4, wherein the fuel is prepared before the metered addition to the exhaust gas, particularly by means of catalytic or thermal cracking.

6. The process according to claim 1, wherein the hydrocarbons are generated by an afterinjection of fuel into the internal-combustion engine.

7. The process according to claim 1, wherein the hydrogen is generated by an early afterinjection of fuel into the internal-combustion engine.

8. The process according to claim 1, wherein the hydrocarbons are intermediately stored in the case of a cold start by means of an additional catalyst close to the engine.

9. The process according to claim 1, wherein the first operating range corresponds to a first predetermined low catalyst temperature range and the second operating range corresponds to a second predetermined catalyst temperature range above the predetermined low catalyst temperature range.

10. The process according to claim 9, wherein the first temperature range is between 50° and 150° C.

11. The process according to claim 10, wherein the third operating range corresponds to a catalyst temperature range above 350° C.

12. An apparatus for reducing nitrogen oxide content in oxygen-containing emissions of an internal combustion engine, comprising:

a catalyst, a hydrogen supply device for supplying hydrogen as a reducing agent upstream of the catalyst, a hydrocarbon supply device for supplying hydrocarbon as a reducing agent upstream of the catalyst, and a control system for controlling the hydrogen and hydrocarbon supply devices as a function of catalyst temperature with only hydrogen supplied during a first catalyst temperature range, with both hydrogen and hydrocarbon supplied during a second catalyst temperature range, and with only hydrocarbon supplied during a third catalyst temperature range.

13. The apparatus according to claim 12, wherein the first operating range corresponds to a first predetermined low catalyst temperature range and the second operating range corresponds to a second predetermined catalyst temperature range above the predetermined low catalyst temperature range.

14. The process according to claim 1, wherein the internal combustion engine is either a diesel engine or a directly injecting Otto engine.

15. The process according to claim 5, wherein the fuel is prepared by catalytic or thermal cracking.

16. The process according to claim 6, wherein the hydrocarbons are generated by a common rail system.

17. The process according to claim 7, wherein the hydrogen is generated by a common rail system.

* * * * *